United States Patent [19]

Trenner

[11] Patent Number: 5,188,018
[45] Date of Patent: Feb. 23, 1993

[54] LINEAR UNIT WITH DISPLACEABLE BALL BEARING ASSEMBLY

[75] Inventor: Albrecht Trenner, Langendorf, Switzerland

[73] Assignee: Montech AG, Derendingen, Switzerland

[21] Appl. No.: 737,442

[22] Filed: Jul. 29, 1991

[30] Foreign Application Priority Data

Aug. 28, 1990 [DE] Fed. Rep. of Germany ....... 4027122

[51] Int. Cl.⁵ .................. F01B 25/26; F01B 11/02; F16J 15/18
[52] U.S. Cl. ..................... 92/5 R; 92/13.1; 92/85 B; 92/165 R; 92/165 PR
[58] Field of Search ............ 92/13.5, 13.51, 13.7, 92/85 R, 85 B, 161, 117 A, 117 R, 128, 165 PR, 167, 177, 66, 169.1, 169.4, 177, 178, 5 R; 91/173; 384/49, 50, 58

[56] References Cited

U.S. PATENT DOCUMENTS

| | | | |
|---|---|---|---|
| 2,922,399 | 1/1960 | Panissidi et al. | 92/117 R X |
| 3,498,190 | 3/1970 | Katko | 92/155 X |
| 3,822,635 | 7/1974 | Nishimura | 92/13.5 X |
| 3,945,300 | 3/1976 | Bourges | 92/52 X |
| 4,043,254 | 8/1977 | Jaeger | 92/85 B |
| 4,111,311 | 9/1978 | Hirama | 92/85 B X |
| 4,515,415 | 5/1985 | Szenger | 384/50 X |
| 4,796,516 | 1/1989 | Horvath | 92/165 PR X |
| 4,838,146 | 6/1989 | Stoll | 92/165 PR X |
| 4,898,080 | 2/1990 | Lieberman | 92/165 PR X |
| 5,081,909 | 1/1992 | Hart | 92/128 X |

FOREIGN PATENT DOCUMENTS

| | | | |
|---|---|---|---|
| 0078496 | 5/1983 | European Pat. Off. | 92/13.5 |
| 0216514 | 12/1984 | Fed. Rep. of Germany | 384/50 |
| 0870808 | 10/1981 | U.S.S.R. | 92/178 |

*Primary Examiner*—Edward K. Look
*Assistant Examiner*—John Ryznic
*Attorney, Agent, or Firm*—Bachman & LaPointe

[57] ABSTRACT

The present invention discloses a linear unit, especially an apparatus for the machining, transportation and manipulation of workpieces, with a housing and with a carriage which is movable out of the housing and to which a handling appliance or the like for the workpiece can be fixed, wherein the carriage is designed as a box section and is mounted slidably in the housing on an adjustably positioned ball bearing assembly, and a groove fixing a stop member of the carriage with a shock absorber being removable from a path of the stop for cushioning of the carriage.

18 Claims, 4 Drawing Sheets

LINEAR UNIT WITH DISPLACEABLE BALL BEARING ASSEMBLY

BACKGROUND OF THE INVENTION

The present invention relates to a linear unit, especially an apparatus for the machining, transportation and manipulation of workpieces, with a housing and with a carriage which is movable out of the housing and to which a handling appliance or the like for the workpiece can be fixed.

Linear units of this type are known and are employed in commerce and industry when constantly recurring worksteps are to be performed. Such linear units can execute especially rectilinear movements. There are known units which have only two end positions and those which have one or more holding positions.

Such linear units are basically of approximately identical constitution and construction. Arranged in a housing is a carriage which possesses a carrier plate at one end, in particular where it comes out of the housing. To be mounted on such a carrier plate are appropriate tools, handling appliances, rotary units or the like which, for example, grasp a workpiece to be machined and bring it into the desired working position. The linear shift of the workpiece is preferably brought about by a pneumatic device which pushes the carriage out of the housing and moves it back again into the initial position.

In general terms, a carriage of this type consists of one, but preferably of two guide rods, to which the carrier plate is assigned on one side and which slide in corresponding bearings. The guide rods are often extended piston rods of pistons which set the carriage in motion.

However, a disadvantage often revealed in such units is that over relatively long strokes, especially during the machining of heavy workpieces, the carriage is no longer absolutely dimensionally stable. A corresponding distortion or bending of the guide rods makes it necessary to allow for undesirable inaccuracies which, though minimal, are nevertheless detectable.

A further disadvantage of such units is the arrangement of the limit stops. Since they are usually located outside the bearing plane of the carriage, high distortion forces likewise arise upon impact and can lead to dimensional inaccuracies or result in increased material wear.

A further serious disadvantage of the linear units of the type described above is that intermediate positions between the limit stops can be set only in specific regions and not over the entire stroke length. However, a simple continuous adjustment of intermediate stops over the entire stroke length is a requisite which repeatedly becomes necessary.

All these disadvantages show themselves during use to be either time-consuming, wearing on material or costly.

SUMMARY OF THE INVENTION

The inventor's set object was to provide a linear unit of the abovementioned type which is highly dimensionally stable and works accurately to dimension and which by continuously adjustable intermediate positions allows a high versatility of use.

To achieve this object, the carriage is designed as a box section and is mounted slidably in the housing.

A linear unit according to the invention consists of a housing comprising an approximately rectangular section portion. The carriage in the form of a box section of approximately rectangular cross-section is inserted roller-mounted in this housing. The two sections can be produced very simply as portions of extruded sections.

The roller mounting consists of ball bearings which are arranged in the housing and which interact with guide rods fixed in or on the box section. At the same time, the ball bearings rest on an axle bolt, on which are formed a threaded portion on the one hand and, preferably via a bolt portion, a slotted head on the other hand. The threaded portion engages into a clamping nut. The clamping nut and the bolt portion are supported against battens or webs which are formed on the housing and which thus constitute an abutment relative to the guide rod.

The slotted head formed on the bolt portion moreover butts with a shoulder against a web. At this point, furthermore, the web is milled exactly plane over its entire length, so that all successive slotted heads and therefore also the axle bolts and ball bearings assume an exact position.

Moreover, a further screw bolt serving as a support for the entire mounting also penetrates into the slotted head. At the same time, an appropriately shaped head of this screw bolt passes through a housing bore, in which it rests flush and at the other end fixes and braces the bolt portion and therefore the entire axle bolt in the housing. By the use of a somewhat eccentric axle bolt, it is possible that the ball bushes can also easily be varied in position or adjusted radially.

The adjustability of the ball bearings guarantees that they run on the guide rods assigned to the box section, in such a way that the side walls of the box section are absolutely parallel to the inner wall of the housing, that is to say the box section or the carriage can be set in the housing. If appropriate, the ball bearings or the axle bolts carrying the ball bearings can be arranged offset relative to one another in the housing.

So that the carriage or the guide rods can roll perfectly and easily via the ball bearings, an appropriate lubricating device is provided. A lubricating device according to the invention consists of small felt sheets or felt plugs which are saturated with an appropriate lubricant. These lubricating sheets or lubricating plugs are supported in corresponding mountings, these mountings being arranged at various points along the guide rods in front or behind the ball bearings. The arrangement is so determined that, in the position of use, under slight pressure the guide rods slide over these felt sheets or felt plugs and thus each time receive lubricant. Even under high continuous load and under high stress, an appropriate lubrication of the guide rods is guaranteed, and the possibility of the guide rods running dry or seizing up is prevented. The felt sheets or felt plugs are easily saturable with lubricant or are exchangeable as a whole.

A cylinder, especially a cylinder which can be subjected to pressure, engages into the box section forming the carriage, this cylinder preferably being connected in an articulated manner to a cylinder holder fastened to an end plate.

At the same time, the cylinder holder has an approximately fork-shaped form, into which engages a bearing lug of the cylinder. For fixing, a bolt passes through the receiving fork and the bearing lug. As well as this type of mounting, an approximately cardanic mounting is also possible. On the other side of this mounting, a piston rod assigned to the cylinder is connected to a driver. The driver is fixed in the interior of the box section forming the carriage and to the box section itself. The connection between the driver and piston rod is preferably made by means of a coupling which is screwed on the one hand into a corresponding threaded bore in the driver and on the other hand to the piston rod by means of a corresponding external thread and which is fixed by a lock nut. Any play occurring between the driver and the piston rod can thus be compensated with the greatest possible accuracy. The driver is likewise fixed releasably to the box section by means of corresponding fastening elements. As a result of this type of fastening, the carriage or the cylinder or both can, if appropriate, be exchanged easily and quickly.

Connections to a pressure source are provided on the end plate for the actuation of the piston rod. When the cylinder is subjected to pressure medium, a transmission of the movement of the piston rod to the carriage takes place, so that the latter moves out of the housing and into the housing, respectively. The use of a box section for the carriage and the type of mounting of the carriage in the housing, guarantee a high stability. The box section itself is distinguished by a high dimensional stability.

This arrangement guarantees a distortion-proof carrying capacity with high dimensional accuracy, even over a relatively long stroke. So that different stroke lengths or end positions for the carriage can be set, approximately T-shaped longitudinal grooves extending parallel to one another are formed laterally in the box section. Stops can be fixed in these longitudinal grooves by means of T-nuts. Fixing is obtained by means of corresponding fastening elements, such as, for example, threaded bolts or the like. By releasing these fastening elements, the stops can be displaced continuously along these longitudinal grooves. For the final fixing of an intermediate position or an end position, a shock absorber is assigned to these stops. It is arranged parallel to the longitudinal groove and is mounted in a shock-absorber holder. The shock-absorber holder is fixed in a radial bore in a piston by means of a threaded bolt. The piston extends vertically relative to the mid-axis of the shock absorber within a cylindrical bore in a stepped stop plate. The stepped stop plate closes the orifice of the housing around the carriage. Chambers are formed within the cylindrical bore on both sides of the piston. These chambers are closed by respective covers which are fixed in a clamping manner by bearing bolts pressing onto the covers. Sealing rings in the covers or around the pistons ensure an airtight closure of the chambers. Of course, screw fastenings or the like can also be considered for closing the chambers, such fastenings entailing a higher cost and being less easy to maintain.

Plug-nipple fastenings are screwed into the chambers on both sides of the piston. These plug-nipple fastenings are each connected to a line carrying the pressure medium, these being guided through the housing and being connected to connections on the end plate.

The piston is moved by subjecting the chambers to pressure medium. According to this movement, within a recess intended for this in the stepped stop plate the shock-absorber holder and with it necessarily the shock absorber are varied in position, specifically in such a way that it changes the paths of the stops.

If, for example, the carriage moves out of the housing, a first stop butts against the shock absorber located in its path. The carriage is thus stopped in a first holding position. After a desired time, the shock absorber changes its positional plane and frees the first stop again. The carriage can move further out of the housing, until the second stop butts against the shock absorber which is now in its plane. The final end position of the stroke movement is reached.

In comparison with the shock absorber described above, the carriage possesses a further stop which interacts in the rear region of the housing with a shock absorber fitted into the end plate. The stop and this shock absorber determine the end position or initial position for the retracted carriage.

Preferably progressively working hydraulic shock absorbers ensure a damped butting of the stops or a damped braking of the carriage in the region of the holding or end position.

The pneumatics which bring out both the stroke movement and the high adjustment or position variation of the shock absorbers are preferably controlled by inductive proximity switches. In the region of the shock absorbers or in the region of the end positions of the stops there are proximity switches which signal the respective end position or intermediate position of the carriage. The proximity switches are retained in plastic sleeves which can be snapped into corresponding bores in the housing. This type of retention of proximity switches allows them to be exchanged quickly and in an uncomplicated way.

For the adjustment or variation in position of the stops determining the intermediate positions and end positions, assembly orifices are provided laterally on the housing. For covering the assembly orifices in the position of use, guide rails, into which cover plates, preferably in the form of plastic strips, can be pushed, are attached. In other exemplary embodiments, however, such cover plates can also be screwed on or attached by means of special fastening elements.

A dovetail-shaped or trapezoidal rail is formed on the underside of the housing. This rail is provided for releasable fixing to an appropriate mounting. A unit thus equipped can be displaced or adjusted continuously over its entire length without much outlay. Together with the intermediate stops, a linear unit so equipped can be set up with optimum effect.

The principal ideal of the invention of such a linear unit is, above all, the use of a box section for forming the carriage. Such a box section has a very high dimensional stability, thereby guaranteeing a high degree of accuracy. Also to be emphasized particularly is the arrangement of the limit stops and intermediate stops. The easy and rapid possibility for the simple continuous adjustment of intermediate positions by the displacement of the stops in the grooved tracks makes the linear unit of the abovementioned type universally practicable.

BRIEF DESCRIPTION OF THE DRAWINGS

Further advantages, features and details of the invention emerge from the following description of preferred exemplary embodiments and from reference to the drawing; in this.

DESCRIPTION OF THE PREFERRED EMBODIMENT

Figure 1:
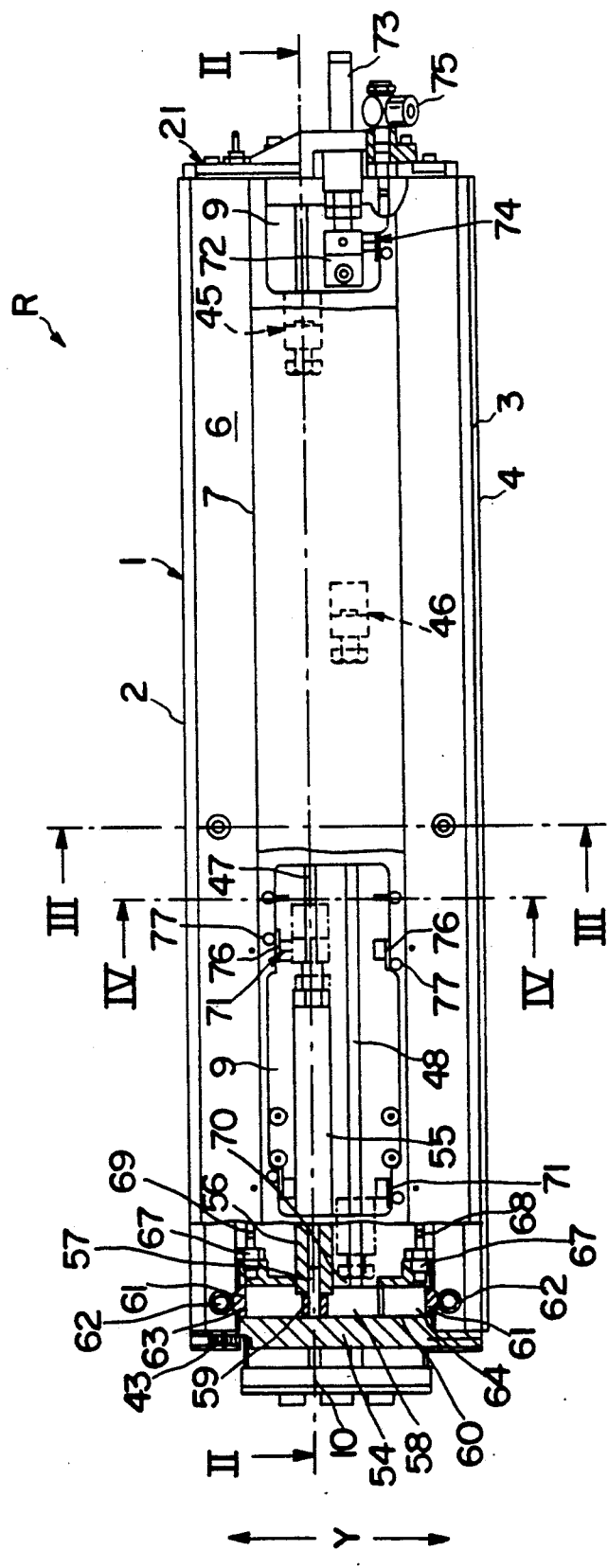
FIG. 1 shows a partially cutaway side view of a linear unit according to the invention.
Figure 3:
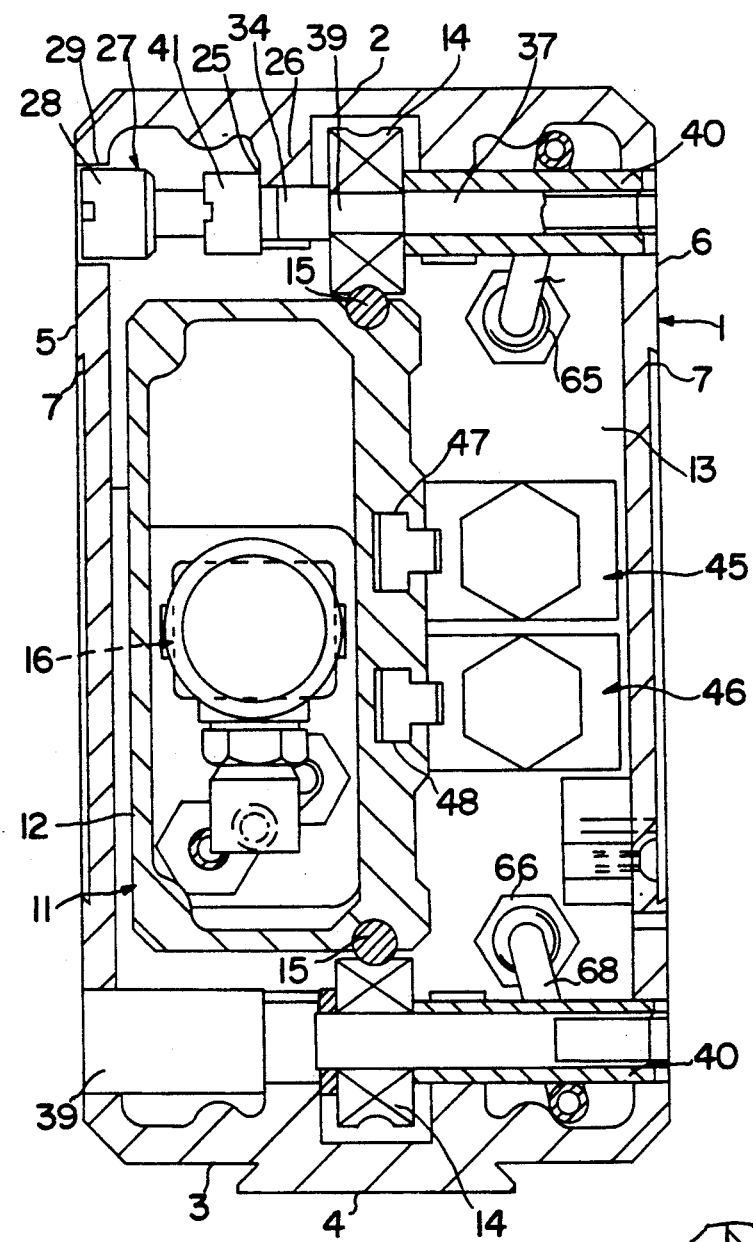
FIG. 3 shows an enlarged cross-section through the linear unit along the line III—III in FIG. 1.

According to FIG. 1, a linear unit R possesses a housing 1 which, as can be seen above all in FIG. 3, has the form of a closed approximately rectangular section.

Figure 5:
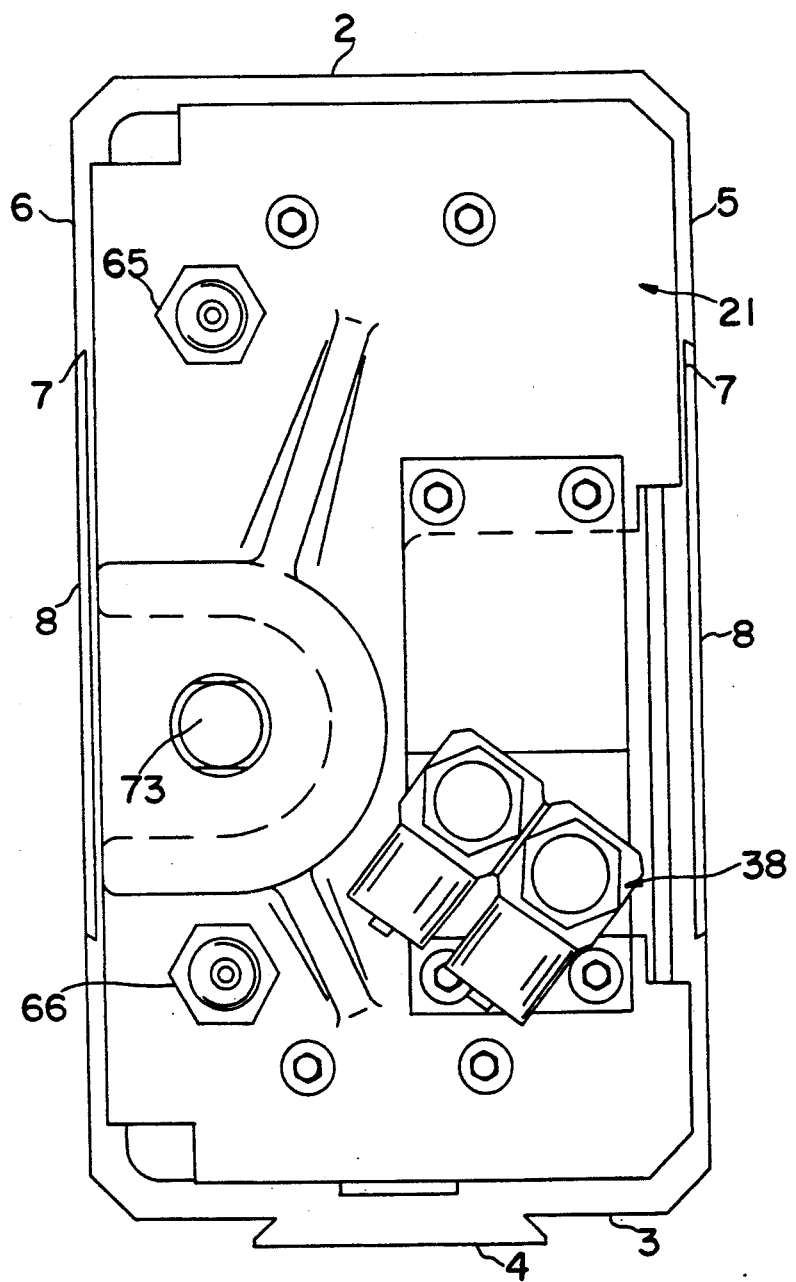
FIG. 5 shows a top view of an end plate of the linear unit.

Whilst the housing 1 has a plane topside 2, a cross-sectionally dovetail-shaped or trapezoidal rail 4 is formed on its underside 3. Side faces 5 and 6 have guide channels 7 for receiving coverplates 8 (see FIG. 5). These coverplates 8 are, for example, plastic strips which are provided for closing and opening assembly orifices 9.

Figure 2:
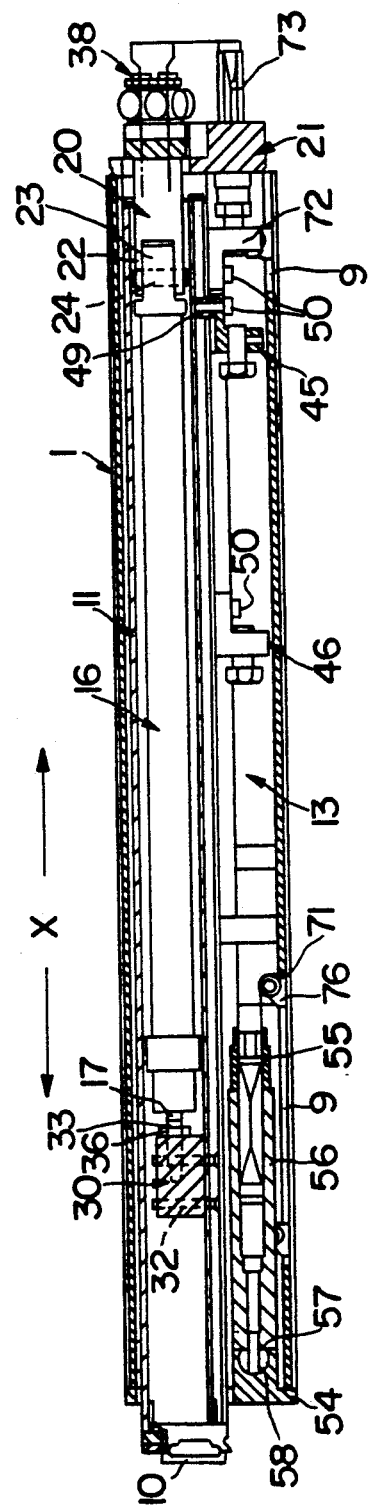
FIG. 2 shows a longitudinal section through the linear unit according to FIG. 1 along the line II—II.

A carriage 11 for the transmission of a linear movement is inserted into the housing 1. The carriage 11 consists of a box section 12 of approximately rectangular cross-section. According to FIG. 3, it is arranged roller-mounted and displaceably on the left-hand side in the interior of the housing 1 so that a free channel 13 is formed in the housing 1 on the right-hand side. The carriage 11 projects from the housing 1 on one side and on this side is equipped on the end face with a carrier plate 10 for receiving a further linear unit, a gripper, tongs, a rotary unit or the like. As can be seen especially in FIG. 2, the carriage 11 has passing through it a cylinder 16, in which a piston rod 17 can be set in motion by means of a piston, not shown in any more detail, which is subjected to pressure medium, especially compressed air.

The cylinder 16 is mounted at one end in a cylinder holder 20 which is fixed to an end plate 21. The cylinder holder 20 projects with a receiving fork 22 into the carriage 11 on the end face, a bearing lug 23 on the cylinder 16 engaging into this receiving fork 22. For final fixing, a bolt 24 passes through the bearing lug 23 in the receiving fork 22.

At the other end, the piston rod 17 is connected to a driver 30 which is screwed to the carriage 11 by means of at least one, but preferably two countersunk screws 32. The piston rod 17 engages with a setscrew 33 into the driver 30 and is fixed by means of a lock nut 36.

Connections 38 to a pressure source are provided on the end plate 21 for the actuation of the piston rod 17. When the cylinder 16 is subjected to pressure medium, a transmission of the movement of the piston rod 17 to the carriage 11 takes place, so that the latter moves out of the housing 1 in the direction x. The carriage 11 at the same time slides between ball bearings 14. These run on preferably hardened and ground guide rods 15 attached in or on the box section 12. These ball bearings 14 are arranged above and below the carriage 11, approximately centrally in the housing 1, each on an axle bolt 39 which, after the ball bearing 14, engages with a threaded portion 37 into a sleeve-shaped clamping nut 40. At the other end of the threaded portion 37, a slotted head 41 is formed on the axle bolt 39 after a bolt portion 34 and butts with a shoulder 25 against a web 26 of the housing 1. The corresponding butting region of the web 26 is milled plane, specifically over its entire length, so that an exact adjustment of the successive ball bearings 14 can be obtained.

A further screw bolt 27 penetrates as a support into the head 41, its head 28 resting flush in a housing bore 29.

Moreover the axle bolt 39 is formed slightly eccentrically on the bolt portion 34, so that, during rotation, any play between the ball bearing 14 and guide rod 15 can be minimized.

Figure 4:
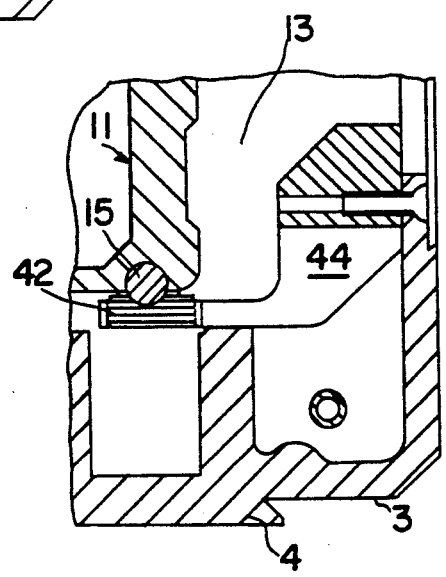
FIG. 4 shows a cutout from an enlarged cross-section through the linear unit along the line IV—IV in FIG. 1.

To guarantee the smooth movement of the carriage 11, especially the sliding of the guide rods 15 on the ball bearings 14, small felt sheets 42 or felt plugs 43 saturable with an appropriate lubricating medium are provided in the housing 1. As can be seen especially in FIG. 4, the felt sheets 42 are so arranged between the ball bearings 14 by means of corresponding sheet holders 44 that, in the position of use, the guide rods 15 slide over them under moderate pressure and receive lubricating medium from the felt sheets 42 or felt plugs 43.

The use of a box section 12 for the carriage 11, on the one hand, and the type of mounting of the carriage 11, on the other hand, ensure a high distortion-proof carrying capacity of the carriage 11, even over a relatively long stroke. A corresponding stress occurring from outside is absorbed, in particular, by the ball bearings 14 via the guide rods 15. A high dimensional stability is thus achieved.

To set different stroke lengths or end positions for the carriage 11, the linear unit R has corresponding stops 45 and 46. To adjust these, two T-shaped longitudinal grooves 47 and 48 extending parallel to one another are formed in the box section 12 laterally towards the channel 13.

By means of T-nuts 49 and corresponding fastening elements 50, such as, for example, threaded bolts or the like, the stops 45 and 46 can be fixed and released and are thus continuously displaceable along these longitudinal grooves 47 and 48.

For the final fixing of an end position or an intermediate position, the stops 45 and 46 are assigned a shock absorber 55 on one side. The shock absorber 55 is arranged parallel to the longitudinal groove 47 and 48 and is mounted in a shock-absorber holder 56. The shock-absorber holder 56 is fixed in a radial bore 59 in a piston 58 by means of a threaded bolt 57 or the like. The piston 58 extends vertically relative to the mid-axis of the shock absorber 55 within a cylindrical bore 60 in a stepped stop plate 54.

Cylindrical bore 60 is closed on both sides of the piston 58 by means of covers 61 which are fixed in a clamping manner by bearing bolts 62, these pressing onto the covers 61. Formed between the piston 58 and the covers 61 there is in each case a chamber 63 and 64, respectively, which can be subjected to a pressure medium, especially compressed air. The chambers 63 and 64 are connected via plug-nipple screw connections 67 to the lines 68 and 69 carrying the pressure medium. These possess connections 65 and 66 on the end plate 21 (see FIG. 3).

If the respective chamber 63 or 64 is subjected to pressure medium, the piston 58 is thereby moved in the direction y. According to this movement, within a recess 70 provided for this in the stepped stop plate 54 or in the cylindrical bore 60 the shock-absorber holder 56 and with it necessarily the shock absorber 55 are varied in position, specifically in such a way that it comes to rest, on the one hand, in the plane of the T-shaped longitudinal groove 47 or of the stop 45 and, on the other hand, in the plane of the T-shaped longitudinal groove 48 or of the stop 46.

By an appropriate arrangement of the stops 45 and 46 along the T-shaped longitudinal grooves 47 and 48 on the one hand and by a variation of the position of the shock absorber 55 on the other hand, desired stroke movements can be obtained and end positions or intermediate positions of the carriage 11 set.

Inductive proximity switches 71 serve for detecting an end position or intermediate position of the stops 45 and 46. These proximity switches 71 register the particular stop 45 or 46 arriving. The proximity switches 71 are arranged in plastic carriers 76 and are snapped into holes 77 in the housing 1. They are accessible from outside and easily exchangeable.

Towards the end plate 21, the carriage 11 is assigned a limit stop 72 which interacts with a shock absorber 73. This limit stop 72 too is assigned an inductive proximity switch 74 of the abovementioned type.

By means of the above-described dovetail-shaped or trapezoidal rail 4 over the entire length of the underside 3 of the housing 1, this linear unit R can be displaced and fixed in a clamping manner over the entire length on an appropriate holding device.

I claim:

1. A linear unit, especially an apparatus for the machining, transportation and manipulation of workpieces, which comprises: a housing; a carriage slidably mounted in the housing and movable out of the housing and to which a handling appliance for the workpiece can be fixed; wherein the carriage is designed as a box section with an approximately rectangular closed section portion; ball bearings arranged in the housing and spaced from each other between which the box section is mounted; guide rods associated with the box section and interacting with the ball bearings for the slidable mounting of the box section; wherein at least one of the ball bearings is displaceable.

2. A linear unit according to claim 1 wherein each ball bearing is arranged on an axial bolt passing through the housing, the ball bearing engaging with a threaded portion of said axial bolt, wherein the threaded portion engages into a sleeve-clamping nut.

3. A linear unit according to claim 2 wherein the ball bearing also is connected via a bolt portion to a slotted head into which penetrates a supporting screw bolt.

4. A linear unit according to claim 3 wherein the slotted head butts against a web of the housing.

5. A linear unit according to claim 3 wherein the axial bolt is connected eccentrically to the bolt portion.

6. A linear unit according to claim 1 including lubricating devices associated with the guide rods.

7. A linear unit according to claim 1 wherein a cylinder which can be subjected to pressure engages into the box section, and a piston rod leading out of the cylinder is connected to the box section.

8. A linear unit according to claim 7 wherein the cylinder is connected in an articulated manner to a cylinder holder fixed to an end plate of the housing.

9. A linear unit according to claim 8 wherein the piston rod is connected to a driver on the side away from the cylinder holder, wherein said driver is fixed to the box section.

10. A linear unit according to claim 1 wherein at least one groove for fixing at least one stop is formed in the box section.

11. A linear unit according to claim 10 wherein a shock absorber is provided at least one side of said unit as a limit stop to the stop.

12. A linear unit according to claim 11 wherein the shock absorber is removable from the path of the stop.

13. A linear unit according to claim 12 wherein a piston slides in a cylindrical bore perpendicularly relative to the path of the stop, the piston holding the shock absorber.

14. A linear unit according to claim 13 wherein a chamber is formed on both sides of the piston in the cylindrical bore which can be subjected to a pressure medium.

15. A linear unit according to claim 14 wherein said chambers are closed by covers on the other side of the piston, the closing taking place by means of clamping means which press on to the covers so that said covers are fixed in a clamping manner.

16. A linear unit according to claim 10 wherein the stop is assigned at least one proximity switch for detecting an end position, the proximity switch being mounted in a carrier which can be snapped into a housing.

17. A linear unit according to claim 1 wherein the housing has assembly orifices which are covered in the position of use by cover plates.

18. A linear unit according to claim 1 wherein the housing has a dovetail-shaped or trapezoidal rail for releasable fixing to a mounting.

* * * * *